United States Patent Office 2,779,507
Patented Jan. 29, 1957

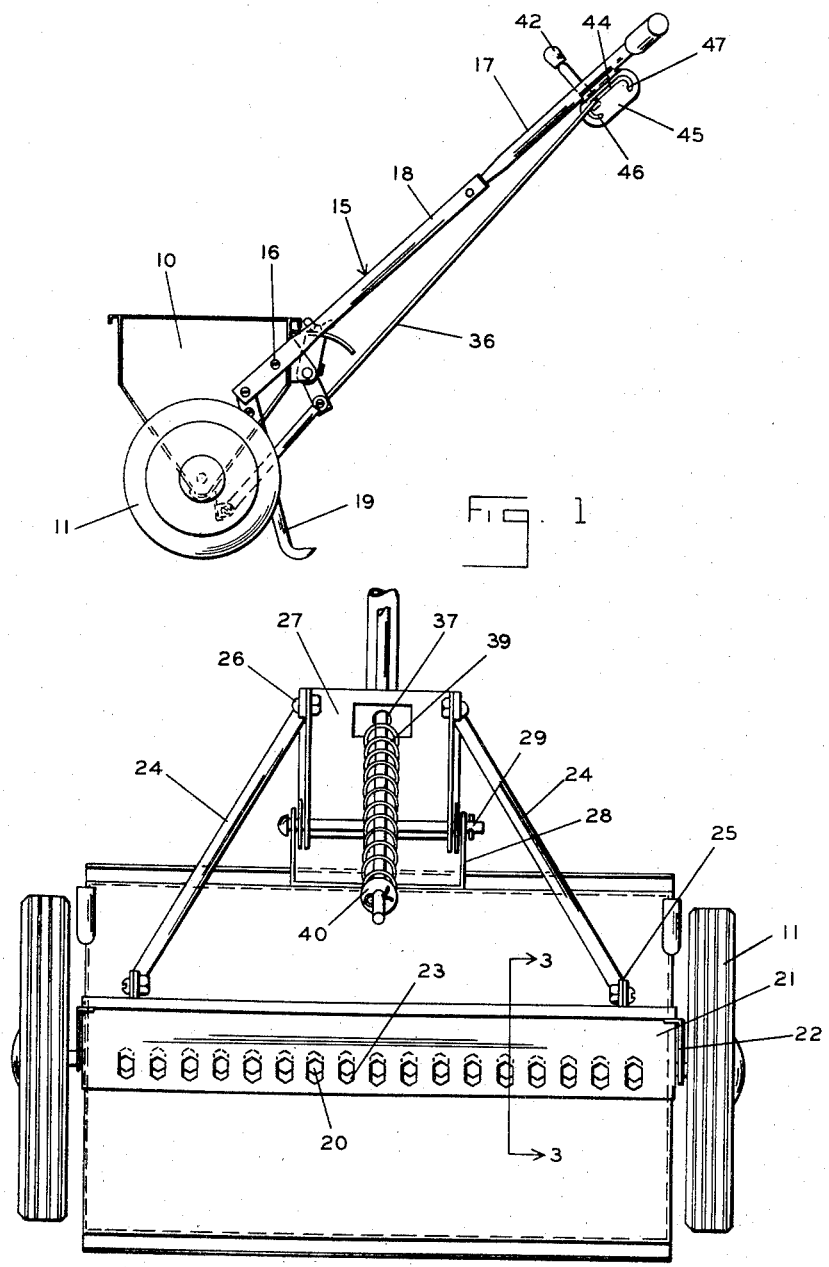

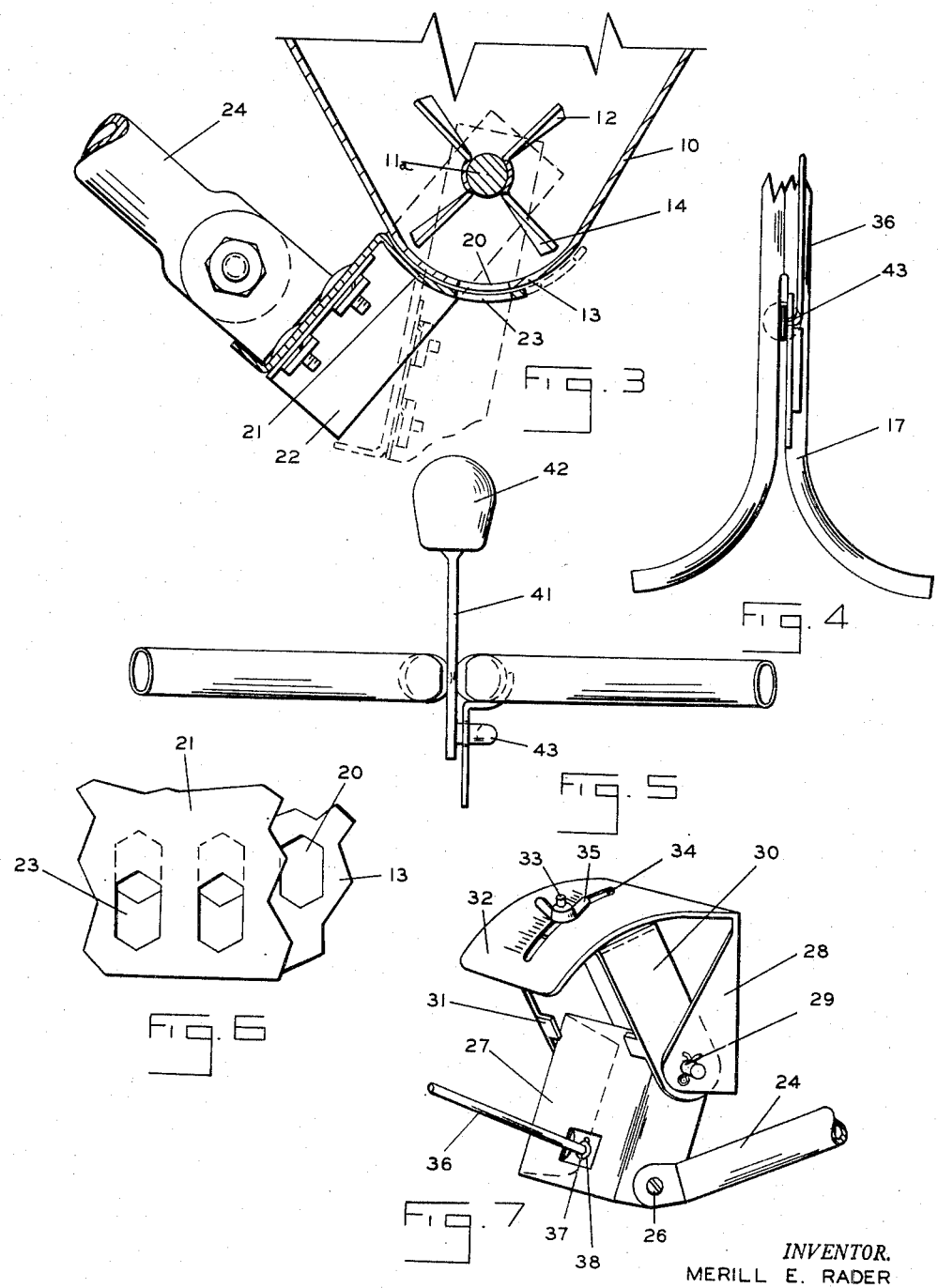

2,779,507

SPREADING DEVICE

Merill E. Rader, Columbus, Ohio, assignor to Steel Company of Ohio, Columbus, Ohio, a corporation of Ohio Application March 28, 1956, Serial No. 574,432

6 Claims. (Cl. 222—177)

My invention relates to a spreading device. It has to do, more specifically, with a spreading device designed for spreading finely comminuted material such as seeds, fertilizer, and other lightweight particles and which is so designed that the feed of such particles can be varied and accurately controlled.

A wide variety of spreaders for similar purposes have been provided in the past. These spreaders have been adjustable to vary the discharge of the comminuted material.

It is one object of my invention to provide a spreader of the type indicated above in which the feed of the material is under positive control and can be varied with accuracy by mechanism which can be set to vary the feed to positive predetermined amounts, such mechanism being very simple and effective, and being readily accessible to the operator.

Another object of my invention is to provide shut-off mechanism in association with the variable feed mechanism which can be actuated to completely shut-off the discharge of material from the spreader, such mechanism also being positive and very simple and the controls thereof being readily accessible to the operator.

Various other objects will be apparent from the drawings and the following description.

The preferred embodiment of my invention is illustrated in the accompanying drawings wherein similar characters of reference designate corresponding parts and wherein:

Figure 1 is a side elevational view of a spreader constructed according to my invention.

Figure 2 is a bottom plan view of the hopper part of the spreader and the associated feed adjustment mechanism.

Figure 3 is a transverse sectional view taken along line 3—3 of Figure 2 through the hopper bottom and associated feed control and shut-off plate.

Figure 4 is a top view of the upper rear portion of the pushing handle of the spreader showing the associated knob which controls the feed control and shut-off plate.

Figure 5 is a rear view of the portion of the handle shown in Figure 4 and the associated control knob.

Figure 6 is a detail in plan illustrating the cooperating feed openings in the bottom of the hopper and the feed control and cut-off plate.

Figure 7 is a detail in perspective of the feed adjustment mechanism.

With reference to the drawings, I have illustrated my spreader as comprising a hopper 10 which is carried by a pair of wheels 11. These wheels are keyed on the outer ends of an agitator shaft 11a which projects outwardly at each side of the hopper. This shaft 11a has an agitator 12 keyed thereon. It will be noted from Figure 3 that the bottom 13 of the hopper 10 is of arcuate form and when the agitator 12 rotates, the outer ends of the blades 14 thereof swing close to the bottom 13.

The spreader is pushed along by means of a handle 15 which is made up of a pair of tubes disposed side-by-side (Figure 4) and which is rigidly attached to the sides of the hopper by bolts 16, it being obvious that the lower end of this handle straddles the hopper. The handle is divided into two sections so that it can be knocked down with the upper section 17 telescoping with the lower section 18 and being normally held together by a bolt 19. The upper section 17 is flared outwardly, as indicated in Figures 4 and 5, to provide laterally extending parts for receiving handle grips. The sides of the hopper are provided with the rearwardly depending legs 19 which are rigidly attached thereto and which rest on the ground and will prevent rearward tipping of the hopper about the axis of the shaft 11 when the handle 15 is released by the operator.

The bottom 13 of the hopper is provided with a set of feed openings 20. These openings are of elongated form and are pointed at each end, extending forwardly and rearwardly as shown in Figure 2. They are arranged in a row of spaced openings extending completely across the width of the hopper bottom. For controlling the flow of material from the hopper downwardly through the openings 20, I provide a shut-off plate 21. This plate is provided at its ends with upwardly extending arms 22 which are rigidly connected thereto and which are pivoted on the projecting ends of the shaft 11a. This plate 21 is curved complemental to the bottom 13 of the hopper and the curvature of both of these members is concentric with the axis of the shaft 11a. Thus, when the plate 21 swings about the shaft 11a it will travel in close engagement with the outer surface of the bottom 13 of the hopper. The shut-off plate 21 is provided with a series of openings 23 which are identical with the openings 20 in the bottom 13 of the hopper. These openings 23 are also spaced laterally in the same manner as the openings 20. Consequently, by swinging the plate 21, the set of openings 23 may be brought into or out of coincidence with the openings 20. This adjustment is shown diagrammatically in Figure 6 and by a comparison of the full-line open position and the dotted line closed position of Figure 3. It will be apparent that as the pointed ends of two cooperating openings are brought together, the feed from the hopper can be made very fine due to the fact that there are two reversed triangular openings coming together which will gradually make a decreasing diamond-shape opening.

For swinging the shut-off plate 21 relative to the bottom 13, a pair of connecting rods 24 are provided each of which is pivoted to the plate 21 at its lower end as indicated at 25. These rods 24 extend rearwardly and upwardly in converging relationship and are pivotally connected at 26 to an actuating arm 27 of flat channel shape. Swinging this arm 27 will exert a push or pull on the rods 24 and will, therefore, swing the shut-off plate 21 relative to the bottom of the hopper.

The actuating arm 27 is pivoted to a bracket 28 at 29 and the bracket is rigidly attached to an upstanding upper portion of the rear wall of the hopper 10. Within this bracket 28 is pivoted an adjustable inverted U-shape stop member 30. This stop member 30 is provided on both sides of its rear edges with inwardly extending stop lugs 31 for engagement with the upper portion of the actuating arm 27 when it is swung rearwardly. The bracket 28 is provided with an upper arcuate gauge portion 32 which overlies the upper end if the stop member 30 and is curved in accordance with the arcuate swing of the upper end of the stop member 30. The member 30 is provided with an upstanding threaded pin 33 which extends upwardly through a slot 34 formed in the gauge portion 32. This member 33 is provided with a wing nut 35 so that member 30 may be adjusted and fixed relative to the gauge portion 32 which is calibrated to indicate the adjustment. Adjusting the stop member 30 relative to the gauge portion 32 will vary the forward or rearward position of the stops 31 and this will vary the rearwardmost position of the lower end of the actuating arm 27. This, in turn, will vary the rearwardmost position to which the shut-off plate 21 can be swung and, consequently, will vary the extent to which the set of openings 23 can be moved rearwardly over and beyond the set of openings 20, as shown by a comparison of the dotted line closed position and the full line open position in Figure 3. In other words, this will vary the size of the ultimate feed openings.

The stops 31 will thus determine the open or feed position of the shut-off plate 21. For moving the shut-off plate 21 between its feed position and its position for completely shutting off the flow of material from the hopper, an actuating rod 36 is provided. This rod extends through an opening 37 in the lower end of the actuating arm 27 and is slidable therein but is provided with a stop collar 38 which limits downward movement through the arm. A compression spring 39 is mounted on the lower end of the rod between a stop collar 40 and the arm 27. If the rod 36 is pulled upwardly, the arm 27 will be swung rearwardly until it contacts the stops 31. This will pull the connecting rods 24 rearwardly and will swing the shut-off plate 21 rearwardly to the predetermined open position so that the feed openings will be of a selected size. As the rod 36 is pushed forwardly, it will swing the arm 27 forwardly, exerting a push on the rods 24 and swinging the shut-off plate 21 to the dotted line position shown in Figure 3 when the openings 20 are completely closed.

The spring 39 will be compressed to a certain extent upon the upward pull on the rod 36 to move the shut-off plate to feed position and this will permit the setting of the stops 31 to provide for different size feed openings.

The rod 36 is pushed forwardly and pulled rearwardly by means of an upstanding arm 41 which is welded to the upper end of the rod 36 and which extends upwardly between the two tubular handle parts of the upper section 17 and which is provided with a knob 42 on its upper end. The extreme upper end of the rod 36 is bent laterally to provide a guide portion 43 which extends into a guide slot 44 in a guide plate 45 which is rigidly fastened between the handle parts of handle section 17. The slot 44 is such that it has depending locating curved ends 46 and 47 which will position and hold the rod 36 in its respective forwardmost closing and rearwardmost feed positions.

The knob 42 will always be in upstanding position above the handle so that it can be readily grasped by the operator. Pulling it rearwardly and pushing it down into the end 46 of the slot 44 will lock the shut-off plate 21 in open or feed position, such position being accurately predetermined by the setting of the pin 33 in the slot 34. The openings 20 and 23 will, at this time, be positioned relatively similar to the way in which they are shown in Figure 6. Thus, the size of the feed openings is accurately predetermined. To shut-off feed from the hopper, it is merely necessary to lift the knob 42 and push it forwardly and down into the other end 46 of the slot 44. This will lock the plate 21 in shut-off position where the hopper openings 20 will be completely covered by a solid part of the plate 21.

Various advantages of this structure will be readily apparent.

Having thus described my invention, what I claim is:

1. A spreader comprising a hopper, a handle extending rearwardly and upwardly from the hopper, a shaft carried by the hopper and extending from the sides thereof, wheels keyed on the outer ends of said shaft, an agitator fixed on the shaft in the hopper and comprising radially extending blades, said hopper having a curved bottom adjacent which the outer ends of the agitator blades swing, a shut-off plate curved complementally to said bottom and mounted for swinging movement about the axis of said shaft which is substantially the axis of curvature of said plate and bottom, a set of openings in said bottom and a set of cooperating openings in said plate which are brought completely out of coincidence when the plate is swung into one position and are brought at least into partial coincidence in another position of said plate to provide a set of feed-openings which are a combination of the two sets and are of selected size to provide the desired feed, the openings of the sets being correspondingly spaced transversely and each opening being of elongated form in the forward and rearward direction and its forward and rearward ends being of triangular form, adjustable means for stopping the shut-off plate in a predetermined position to determine the size of the feed-openings, a push-pull rod connected to said shut-off plate for swinging it to its different positions and extending rearwardly along said handle, means for holding the rod in its forward or rearward position and comprising a plate carried by the handle and having a guide slot therein, said rod carrying a guide portion which extends into said slot, said adjustable means comprising a bracket carried by the hopper, an actuating arm pivoted to the bracket and connected to said shut-off plate and said rod, and adjustable stops carried by the bracket and adapted to engage said arm.

2. A spreader according to claim 1 in which said stops are carried by a stop member pivoted to said bracket, and means for setting said stop member relative to said bracket.

3. A spreader according to claim 2 in which said rod is connected to said arm for limited sliding movement, said rod carrying a stop for engaging the rear side of said arm and a compression spring between the forward side of said arm and a second stop carried by the end of the rod.

4. A spreader comprising a hopper having a bottom with openings therein, a shut-off plate movable relative to the bottom, means for moving said plate to cover the openings in said hopper or to at least partially expose said openings to provide feed openings, said means comprising a push-pull rod connected to said plate, means for holding said rod in forward or rearward positions, and adjustable means for stopping the plate in a predetermined position to determine the size of the feed openings, and comprising a bracket carried by the hopper, an actuating arm pivoted to the bracket and connected to said plate and said rod, and adjustable stops carried by the bracket and adapted to engage said arm.

5. A spreader according to claim 4 in which said stops are carried by a stop member pivoted to said bracket, and means for setting said stop member relative to said bracket.

6. A spreader according to claim 5 in which said rod is connected to said arm for limited sliding movement, said rod carrying a stop for engaging the rear side of said arm and a compression spring between the forward side of said arm and a second stop carried by the end of the rod.

References Cited in the file of this patent

UNITED STATES PATENTS

| 2,630,945 | Ganrud | Mar. 10, 1953 |
| 2,718,986 | Peoples | Sept. 21, 1955 |

OTHER REFERENCES

Scott's Spreader, Scotts Service Manual No. 492, September 1950, pages 1 and 2.